United States Patent Office 3,313,850  
Patented Apr. 11, 1967

3,313,850
UNSATURATED ACID AMIDES CONTAINING SULPHONIC GROUPS AND METHOD OF PREPARATION
Ulrich Bahr, Edgar Siegel and Günther Nischk, all of Leverkusen, Germany, assignors to Farbenfabriken Bayer Aktiengesellschaft, Leverkusen, Germany, a German corporation
No Drawing. Filed Feb. 6, 1964, Ser. No. 343,102
Claims priority, application Germany, Mar. 6, 1963, F 39,175
12 Claims. (Cl. 260—561)

The object of the present invention are unsaturated acid amides, containing sulphonyl groups, of the general formula

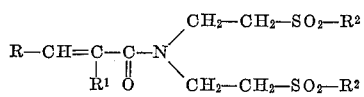

wherein R represents hydrogen or an alkyl or aryl radical, $R^1$ represents hydrogen or an alkyl radical and $R^2$ represents an alkyl or aryl radical, and a process for preparing these compounds.

It is already known that acryonitrile, which has a strongly activated double bond, can be reacted with acid amides in the presence of basic catalysts. In this process, formamide reacts with about 5 to 6 molecules of acrylonitrile whereas only monoadducts are obtained from the acetamide (Angewandte Chemie 61, page 65 (1949)).

It has now been found that unsaturated acid amides containing sulphonic groups can be prepared by reacting α,β-unsaturated sulphones of the formula

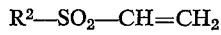

with unsaturated acid amides of the formula

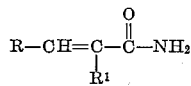

in the presence of basic catalysts. In these formulae R, $R^1$ and $R^2$ have the meaning given above.

It is surprising that in the presence of alkaline catalysts, 2 molecules of an α,β-unsaturated sulphone can be added by direct reaction to the unsaurated acid amides of the above formula. The di-addition compounds are obtained even when the starting compounds are reacted together in the molar ratio 1:1. However, to obtain good yields it is advisable to use at least 2 mols of the α,β-unsaturated sulphone to 1 mol of the acid amide. The reaction proceeds under such mild conditions that practically no polymerization by an ionic mechanism takes place although two compounds having very reactive double bonds are reacted together and a strongly basic catalyst is present.

The reaction may simply be carried out by dissolving or suspending 1 mol of the acid amide in 2 to 3 mols of the α,β-unsaturated sulphone at a temperature in the range of about 10 to about 150° C., preferably about 50 to 100° C. and then introducing a strong base as catalyst in small amounts. The slightly exothermic reaction can be accurately controlled by the speed of addition of the catalyst. The addition compounds obtained can easily be recovered in the pure form by recrystallization from suitable solvents.

Examples of unsaturated acid amides of the given formula are acrylic acid amide, methacrylic acid amide, crotonic acid amide, cinnamic acid amide, p-chlorocinnamic acid amide, p-methyl-cinnamic acid amide, β-(1-naphthyl)-acrylic acid amide and butene-(1)-carboxylic acid-(1)-amide. Examples of suitable α,β-unsaturated sulphones are methyl-vinyl-sulphone, ethyl-vinyl-sulphone, butyl-vinyl-sulphone, phenyl-vinyl-sulphone, octyl-vinyl-sulphone, cyclohexyl-vinyl-sulphone, isobutyl-vinyl-sulphone, p-tolyl-vinyl-sulphone and p-chlorophenyl-vinyl-sulphone. Strong bases such as alkali metals, as e.g. sodium and potassium, alkali metal alkoxides, as e.g. sodium and potassium methoxide, ethoxide and butoxide and alkali metal hydrides, as e.g. sodium and potassium hydrides may be used as catalysts. They are generally employed in quantities of about 0.05 to 0.5 mol per mol of acid amide.

The reaction may also be carried out in an inert organic solvent, in particular ethers such as dioxane, tetrahydrofurane, ethylene glycol diethyl and diethylene glycol dimethyl ether.

The unsaturated acid amides containing sulphone groups according to the invention are valuable intermediate products for the preparation of medicaments and plant protective agents. They are further suitable as comonomers for the polymerization with acrylonitrile.

EXAMPLE 1

14.2 g. acrylic acid amide, 53 g. vinyl-methyl-sulphone (0.5 mol) and 0.1 g. hydroquinone are thoroughly mixed and heated to 50° C. Sodium butoxide is then slowly added and the mixture then stirred for a short time at 80° C. The reaction product is recrystallized from ethanol. 17 g. of the adduct of the formula

are obtained. The adduct melts at 144° C. after strong sintering. 7 g. of this compound and 78 ml. of acrylonitrile are added to 1 l. of water, the pH-value of which was adjusted to 2.5 by addition of sulfuric acid and the mixture heated to 50° C. Then 0.5 g. of potassium persulfate and 2 g. of sodium-m-bisulfite are added and the temperature kept at 50° C. while stirring.

The precipitated polymer was recovered by filtration and thoroughly washed with water. Yield 88% of the theoretical. K-value of the polymer: 82. The polymer may be spun from a dimethylformamide solution in known manner. The filaments show an improved absorption of water, as compared with filaments of pure acrylonitrile polymer.

EXAMPLE 2

8.5 g. methacrylic acid amide (0.1 mol), 10.6 g. vinyl-methyl-sulphone (0.1 mol) and a small quantity of hydroquinone as polymerization inhibitor are thoroughly mixed together. Sodium methoxide is added in small portions, the temperature being permitted to rise to 50 to 60° C. When further addition of catalyst no longer produces any marked increase in temperature, the mixture is heated to 80° C. and stirred for another 10 to 15 minutes at this temperature.

The reaction mixture is recrystallized twice from ethanol. 12.4 g. of the di-adduct

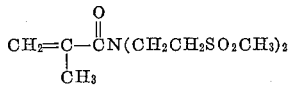

having a melting point of 108° C. are obtained.

Calculated for $C_{10}H_{19}NO_5S_2$: C, 40.3%; H, 6.43%; N, 4.71%; S, 21.5%. Found: C, 40.4%; H, 6.60%; N, 5.20%; S, 21.5%.

As shown by this example, the adduct of 2 molecules vinyl-methyl-sulphone and 1 molecule methacrylic acid amide is formed even when the compounds are mixed in equimolar proportions. This compound was copolymerized with acrylonitrile analogously to Example 1. The filaments showed the same improved absorption of water.

EXAMPLE 3

17 g. methacrylic acid amide (0.2 mole), 42.5 g. vinyl-methyl-sulphone (0.4 mol) and 0.1 g. hydroquinone are thoroughly mixed and heated to 50° C. 0.8 g. sodium methoxide is slowly added at this temperature. When the reaction has finished, the mixture is stirred for another 10 minutes at 80° C.

37 g. of the same di-adduct as in Example 2 is obtained.

EXAMPLE 4

A mixture of 8.5 g. methacrylic acid amide (0.1 mol), 26.5 g. vinyl-methyl-sulphone (0.25 mol) and 0.1 g. tertiary butyl pyrocatechol is heated to 60° C. The reaction mixture solidifies after 0.85 g. powdered potassium hydroxide has been introduced at this temperature over 1 hour. 17.7 g. of the pure di-adduct as in Example 2, of melting point 106° C., are obtained by recrystallization from ethanol.

EXAMPLE 5

8.5 g. methacrylic acid amide (0.1 mol), 26.5 g. vinyl-methyl-sulphone (0.25 mol) and 0.1 g. tertiary butyl pyrocatechol are dissolved in 50 ml. dioxane. 2.1 g. sodium butoxide is added in small portions to this solution at 50° C. in the course of 1¼ hours. The mixture is then stirred for another 20 minutes at 80° C. The adduct which separates out on cooling is recrystallized from ethanol to purify it. It is identical to that obtained in Examples 2 to 4.

EXAMPLE 6

A mixture of 17 g. crotonic acid amide (0.2 mol), 53 g. vinyl-methyl-sulphone (0.5 mol) and 0.1 g. hydroquinone is heated to 50° C. and 1.4 g. sodium butoxide is slowly introduced at this temperature. After stirring for ½ hour at 80° C., the product is recrystallized from ethanol. 38.5 g. of the adduct of the formula

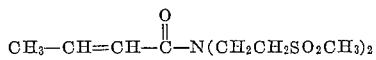

are obtained. Melting point 125° C., after double recrystallization from methanol.

Calculated for $C_{10}H_{19}NO_5S_2$: C, 40.3%; H, 6.43%; N, 4.71%; S, 21.5%. Found: C, 40.2%; H, 6.30%; N, 5.19%; S, 22.1%.

EXAMPLE 7

A mixture of 4.2 g. (0.05 mol) methacrylic acid amide and 21 g. (0.125 mol) phenyl-vinyl-sulphone and 0.2 g. hydroquinone is heated to 60° C. Approximately 0.3 g. sodium-tertiary butoxide is then slowly added. The reaction mixture solidifies after a short time. The product is crystallized twice from ethanol and 12.5 g. of the adduct

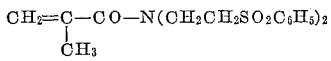

of melting point 145° C. are obtained.

EXAMPLE 8

A mixture of 14.7 g. of cinnamic acid amide and 26.5 g. of vinyl-methyl-sulphone is heated to 55° C. At this temperature there are added 0.3 g. of sodium-tert.-butoxide in the course of 13 minutes. The compound

is formed in a strongly exothermic reaction. This compound has a melting point of 170° C. after recrystallization from dioxane. The yield is 20 g.

Calculated for $C_{15}H_{21}NO_5S_2$: C, 50.12%; H, 5.89%; N, 3.90%; S, 17.84%. Found: C, 50.88%; H, 5.92%; N, 4.43%; S, 19.04%.

We claim:

1. A compound of the formula

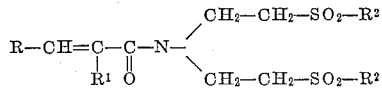

wherein R is a member of the group consisting of hydrogen, methyl, phenyl, naphthyl, chlorophenyl and lower alkylphenyl, $R^1$ is a member of the group consisting of hydrogen and methyl, $R^2$ is a member of the group consisting of $C_1$ to $C_8$ alkyl, cyclohexyl, phenyl, lower alkylphenyl and chlorophenyl.

2.

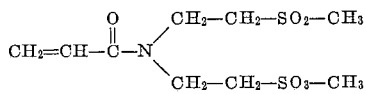

3.

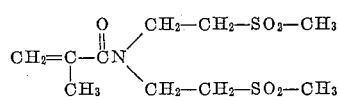

4.

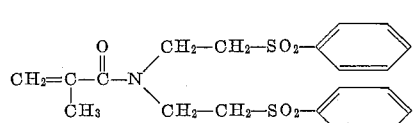

5.

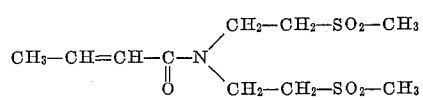

6. Process for the preparation of unsaturated acid amides containing sulphonic groups, which comprises reacting at a temperature of 10 to 150° C. an unsaturated acid amide of the general formula

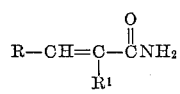

wherein R is a member of the group consisting of hydrogen, methyl, phenyl, naphthyl, chlorophenyl and lower alkyl phenyl and $R^1$ is a member of the group consisting of hydrogen and methyl, with an α,β-unsaturated sulphone of the formula

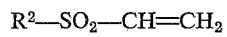

wherein $R^2$ is a member of the group consisting of $C_1$–$C_8$ alkyl, cyclohexyl, phenyl, naphthyl, chlorophenyl and lower alkyl phenyl in the presence of an alkaline catalyst.

7. Process according to claim 6, wherein said alkaline catalyst is selected from the group consisting of alkali metals, alkali metal alkoxides and alkali metal hydrides.

8. Process according to claim 6, wherein said catalyst is sodium methoxide.

9. Process according to claim 6, wherein said catalyst is sodium butoxide.

10. Process for the preparation of unsaturated acid amides containing sulphonic groups, which comprises reacting at a temperature of 10 to 150° C. an unsaturated acid amide of the general formula

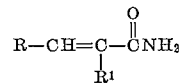

wherein R is a member of the group consisting of hydrogen, methyl, phenyl, naphthyl, chlorophenyl and lower alkyl phenyl and $R^1$ is a member of the group consisting of hydrogen and methyl, with an α,β-unsaturated sulphone of the formula

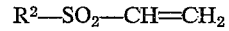

wherein $R^2$ is a member of the group consisting of $C_1$–$C_8$ alkyl, cyclohexyl, phenyl, naphthyl, chlorophenyl and lower alkyl phenyl in the presence of an alkaline catalyst and in the presence of an inert organic solvent.

11. Process according to claim 10, wherein said inert organic solvent is selected from the group consisting of dioxane, tetrahydrofurane, ethylene glycol diethyl ether and diethylene glycol diethyl ether.

12. Process for the preparation of unsaturated acid amides containing sulphonic groups, which comprises reacting at a temperature of 50 to 100° C. 1 mol of an unsaturated acid amide of the general formula

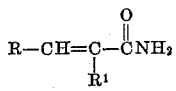

wherein R is a member of the group consisting of hydrogen, methyl, phenyl, naphthyl, chlorophenyl and lower alkyl phenyl and $R^1$ is a member of the group consisting of hydrogen and methyl, with between 2 and 3 mols of an $\alpha,\beta$-unsaturated sulphone of the formula

wherein $R^2$ is a member of the group consisting of $C_1$–$C_8$ alkyl, cyclohexyl, phenyl, naphthyl, chlorophenyl and lower alkyl phenyl in the presence of 0.05 to 0.5 mol of an alkaline catalyst.

No references cited.

ALEX MAZEL, *Primary Examiner.*

JOSEPH A. NARCAVAGE, *Assistant Examiner.*